US007751216B2

(12) United States Patent
Su

(10) Patent No.: US 7,751,216 B2
(45) Date of Patent: Jul. 6, 2010

(54) VOLTAGE TRANSFORMER WITH MECHANICALLY ACTUATED VOLTAGE-SELECTED SWITCHES

(75) Inventor: Carl Su, Taipei (TW)

(73) Assignee: Kerio Technologies, Inc., Taipei (TW)

( * ) Notice: Subject to any disclaimer, the term of this patent is extended or adjusted under 35 U.S.C. 154(b) by 315 days.

(21) Appl. No.: 11/798,661

(22) Filed: May 16, 2007

(65) Prior Publication Data

US 2007/0278859 A1 Dec. 6, 2007

(30) Foreign Application Priority Data

Jun. 2, 2006 (TW) .............................. 95119146 A

(51) Int. Cl.
*H02M 1/00* (2007.01)
*H01R 29/00* (2006.01)

(52) U.S. Cl. ........................ 363/146; 439/188; 439/956

(58) Field of Classification Search ................... 307/29; 363/146; 439/46, 49–51, 64, 91, 138, 159, 439/188, 955

See application file for complete search history.

(56) References Cited

U.S. PATENT DOCUMENTS

| | | | | |
|---|---|---|---|---|
| 3,697,770 | A * | 10/1972 | Murata et al. | 307/141.4 |
| 5,900,684 | A * | 5/1999 | Lam | 363/146 |
| 6,020,692 | A * | 2/2000 | Rcraw et al. | 315/320 |
| 6,628,535 | B1 * | 9/2003 | Wu | 363/146 |
| 6,972,975 | B2 * | 12/2005 | Su | 363/146 |
| 7,242,115 | B2 * | 7/2007 | Liu | 307/151 |
| 7,245,515 | B2 * | 7/2007 | Chiang | 363/146 |
| 7,426,126 | B1 * | 9/2008 | Lai | 363/146 |
| 2002/0154528 | A1 * | 10/2002 | Ravid | 363/146 |
| 2003/0230934 | A1 * | 12/2003 | Cordelli et al. | 307/43 |
| 2004/0085694 | A1 * | 5/2004 | Germagian et al. | 361/90 |
| 2004/0151011 | A1 * | 8/2004 | Toyomura et al. | 363/146 |

* cited by examiner

*Primary Examiner*—Bao Q Vu
*Assistant Examiner*—Jue Zhang
(74) *Attorney, Agent, or Firm*—Bacon & Thomas, PLLC

(57) ABSTRACT

A voltage transformer with mechanically actuated voltage-selected switch provides an input voltage pass through a voltage transformation unit, wherein the unit is disposed in the casing and its both ends are electrically connected to the input port and output port respectively, and transforms this input voltage into the predetermined output voltages corresponding to the selective switches according to selection of the mechanically actuated voltage-selected switch.

10 Claims, 9 Drawing Sheets

VOLTAGE TRANSFORMER WITH MECHANICALLY ACTUATED VOLTAGE-SELECTED SWITCHES

FIELD OF THE INVENTION

The present invention relates to a voltage transformer, which can generate different outputs via switch selection; and in particular to a voltage transformer with mechanically actuated voltage-selected switches.

BACKGROUND OF THE INVENTION

Voltage transformers have become indispensable to modern life, especially we live in this electric appliance-ridden age, for example, electric appliances, such as walkmans, mobile phones, MP3, notebook computers and so forth are almost in use of voltage transformers. The specifications of voltage transformers are numerous. Some input voltages are 110 volt AC, others are 220 volt AC; the output specifications may further vary from electric appliance to electric appliance and that would generate more different requirements for the output voltages, such as the output voltage required by the voltage transformer of mobile phone chargers may be only 5 volt DC; portable computers may need 19 volt DC; and such as the output voltage required by the voltage transformer of the external computer modem is 12 volt AC.

Nowadays more novel voltage transformers can encompass the full range of input voltages, that is, input voltages from 100 volt AC to 240 volt AC, all the input voltages within this range can be transformed into a fixed output voltage; nevertheless, the output voltage is a fixed voltage, as well as every electric appliance product requires different input voltages, so the voltage transformers corresponding to the output voltages respectively are necessary for meeting the requirement of every electric appliance product.

Today, every ordinary family has at least several even tens of voltage transformers with different sizes and specifications. If there is a function of which various output voltages can be selected in one voltage transformer, thus one voltage transformer can correspond to the voltages required by several different electric appliance products, then, that can significantly decrease the quantity of use of a variety of voltage transformers required, and eliminate unnecessary expenses. In particular, when people go outside carrying many kinds of different electric appliance products, such as traveling abroad or traveling on official business, it is quite cumbersome that every electric appliance product in the baggage is accompanied with a dedicated voltage transformer; if we use this kind of voltage transformer capable of corresponding to various voltage requirements simultaneously at this time, that will lighten the baggage loading effectively and considerably enhance the convenience.

As shown in FIG. 1, it is a common voltage transformer with adjustable multiple voltage outputs in market condition. After a fixed voltage is inputted into the power supply input terminal 11, the power supply output terminal 13 would generate a fixed output voltage via the voltage transformation circuit in the voltage transformer body 12. If it is necessary to change the output voltage, as long as it needs to adjust the output voltage selector 15 on the output voltage selective switch 14 to a corresponding position, then a corresponding output voltage will be generated.

However, such selective switches are easily led to abrasion owing to frequent switching, it makes the positioning effect of switching the voltage selector 15 gradually deviated or imperfectly contacted and causes unstable voltage outputs or even error voltage outputs, when serious circumstances occur, it will result in damage of electric appliances. In particular, since most output voltage values are simply labeled by stickers, they might displace or fall off due to long-term use as well, that further misleads consumers and then generates error outputs.

Besides, some dealers have incorporated guide tabs, which contained different circuit elements into the same voltage transformation circuits and thereby created prospective voltage transformation effect. However, the jacks and terminals exposed to the air are accessible to be affected by moisture due to weather and gradual rustiness results in imperfect contact, it is also possible that the guide tabs cannot contact the terminals in the jacks at all and causes failure of the voltage transformers because dust or flocks clog in the jacks.

SUMMARY OF THE INVENTION

Accordingly, an object of the present invention is to provide a voltage transformer with mechanically actuated voltage-selected switches, which is less easily affected by moisture due to weather as well as dust.

Another object of the present invention is to provide a voltage transformer with mechanically actuated voltage-selected switches, which can significantly reduce imperfect contact or failure in circuit conduction owing to long-term or frequent use.

A further object of the present invention is to provide a voltage transformer with mechanically actuated voltage-selected switches, which is simple structured and reduces cost effectively.

A still further object of the present invention is to provide a voltage transformer with mechanically actuated voltage-selected switches, which is more convenient and flexible in use.

Therefore, the voltage transformer with mechanically actuated voltage-selected switches of the present invention for providing an input voltage transformed into one of a plurality of predetermined output voltages, comprises: a casing configured with a plurality of sockets; an input port for receiving said input voltage; an output port for outputting one of a plurality of said predetermined output voltages; a voltage transformation unit, wherein the unit is disposed in the casing and its both ends are electrically connected to the input port and output port respectively, which comprises a voltage transformation circuit; and a plurality of selective circuits, provided with a plurality of mechanically actuated voltage-selected switches corresponding to said sockets of the casing respectively, and a plurality of different circuit elements corresponding to each of said mechanically actuated voltage-selected switches respectively, one side of said selective circuits is connected to said voltage transformation circuit; and a pin for plugging into one of said sockets and actuating said corresponding mechanically actuated voltage-selected switches, thereby selecting said output voltage.

By way of the present invention, it not only can solve the inconvenience in providing several voltage transformers with single voltage output formerly, but also can improve that the voltage transformers with adjustable multiple voltage outputs readily generated unstable or no voltage output, even the problem of error voltage outputs in the foretime. It can be said to kill several birds with one stone.

DETAILED DESCRIPTION OF THE PREFERRED EMBODIMENTS

The above-mentioned and other technical contents, features, and functions of the present invention are clearly illustrated in the following detailed description of the preferred embodiments in coordination with the reference drawings.

Figure 1:
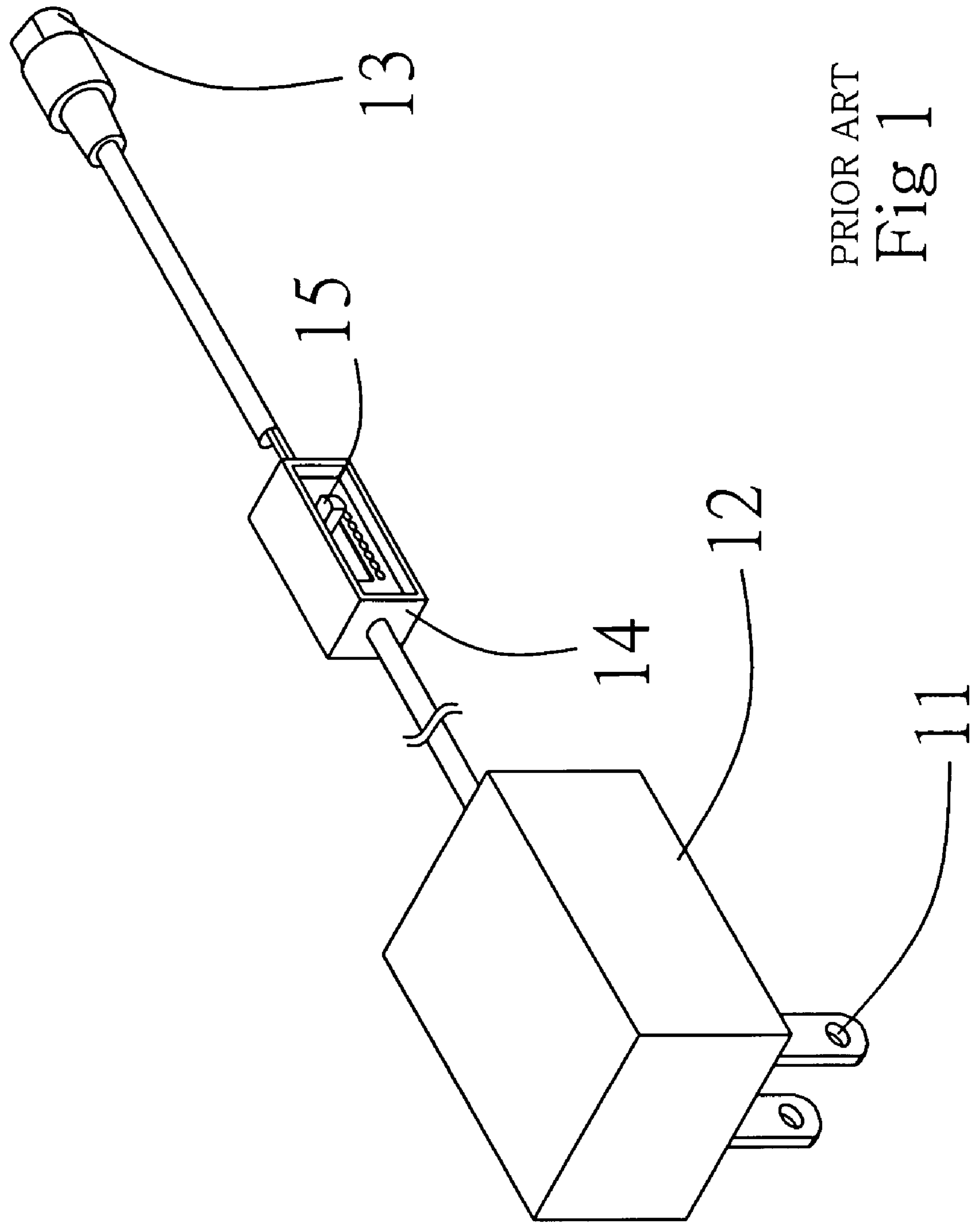
PRIOR ART Fig 1
FIG. 1 is a common voltage transformer with adjustable multiple voltage outputs in market condition.
Figure 2:
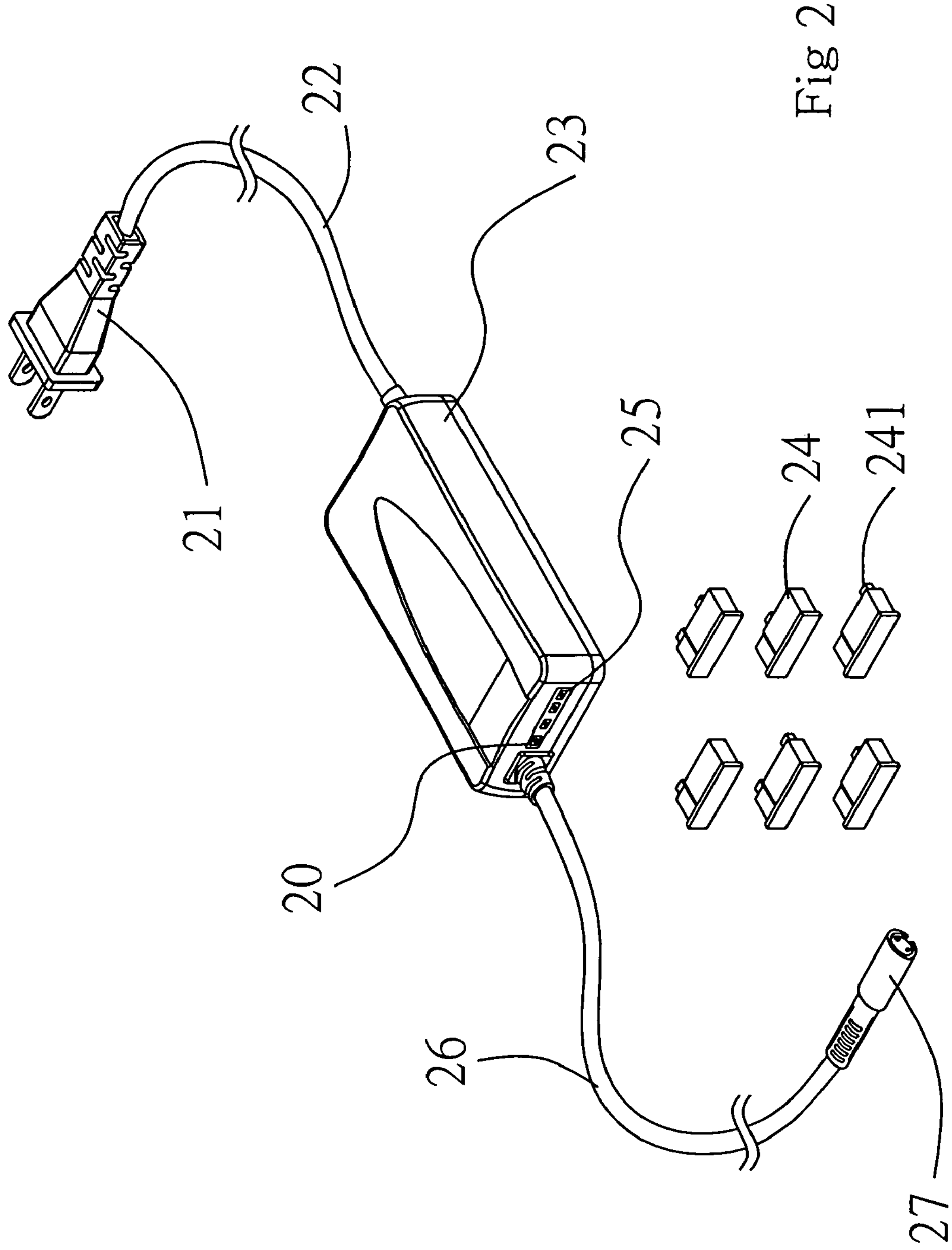
FIG. 2 is a pictorial schematic diagram of the first preferred embodiment of the voltage transformer with mechanically actuated voltage-selected switches according to the present invention.
Figure 3:
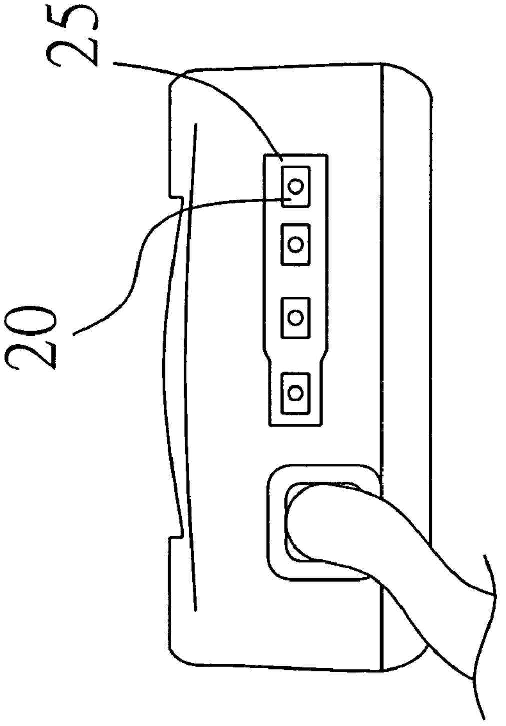
FIG. 3 is an elevational view of the embodiment of FIG. 2, illustrating the structures of the sockets and switches.

Referring to FIGS. 2 and 3, the first preferred embodiment of the voltage transformer with mechanically actuated voltage-selected switches according to the present invention is shown. In this embodiment, it is exemplified by general indoor power supply, hence its input voltage is 110 volt AC, definitely, those skilled in the art will easily realize that the input voltage may also be 220 volt AC, or such as automotive 12 volt DC.

Figure 10:
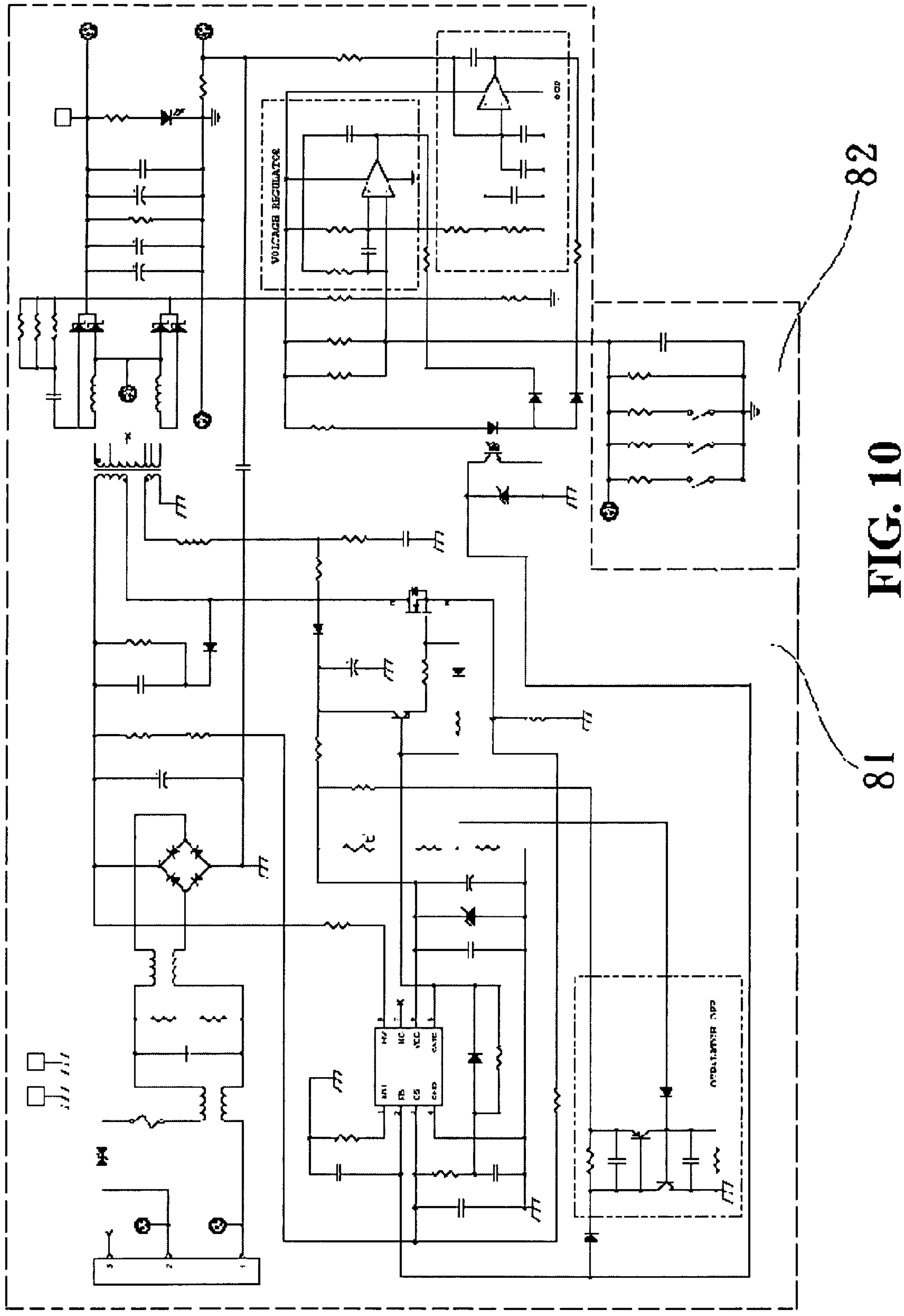
FIG. 10 is a circuit diagram of the voltage transformer according to the present invention, illustrating the voltage transformation unit.

In this embodiment, the above-mentioned constant input voltage passes through a plug served as the input port 21, and the input conducting wire 22 electrically connected to the circuits inside the casing 23, and an output voltage due to voltage variation caused by the interaction of the voltage transformation circuit and selective circuits passes through the output conducting wire 26 and is electrically connected to the output port 27 for outputting the output voltages. In this embodiment, the voltage transformation unit is shown as FIG. 10, divided into the voltage transformation circuit 81 and the selective circuits 82, in the selective circuits 82, there are a plurality of switches and a plurality of different circuit elements corresponding to each of the mechanically actuated voltage-selected switches respectively, each switch is such as microswitch.

Figure 4:
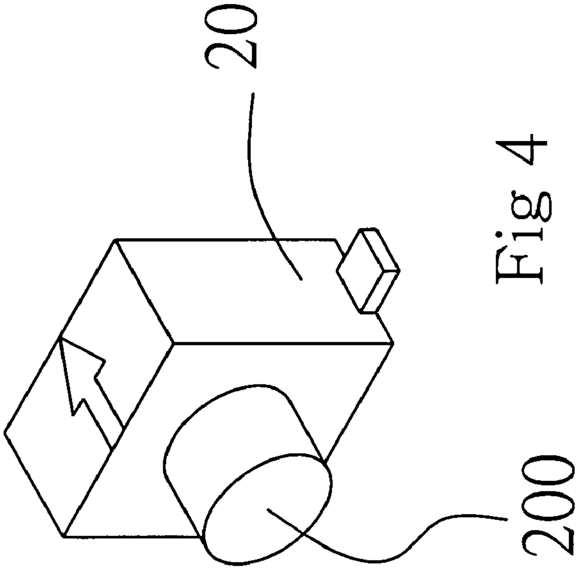
FIG. 4 is a pictorial schematic diagram of the switches of the embodiment of FIG. 2.

The casing 23 is configured with a plurality of sockets 25, and there are several different kinds of pins 24, having the different positioned projecting portions 241 with various shapes respectively. In each one socket 25, as shown in FIG. 4, a corresponding mechanically actuated switch 20 is disposed. The mechanically actuated switches 20 in this embodiment further have touch pieces 200. The projecting portions 241 are put into the sockets 25 by equipment with the various pins 24 and bunt the touch pieces 200 of the corresponding switches 20, thereby actuating the different mechanically actuated switches 20.

In one aspect, since the mechanically actuated switches themselves have no exposed metallic contacts, nor the pins have no metallic contacts necessary to contact the switches, even if flocks, dust exist in the sockets, they still cannot block actuating the switches. Therefore, it can ensure reliable operation. In another aspect, the pins and sockets are brought into a state of tight integration, and that further makes the mechanically actuated voltage-selected switches subject to good protection. Moisture and dust in the air will get into the casing much less readily. Since these mechanically actuated voltage-selected switches are mechanically actuated, their durability and stability are far above than those of generally used slide switches by tens of times, even hundreds of times, imperfect contact or failure in circuit conduction owing to long-term or frequent use will be considerably reduced.

Figure 5:
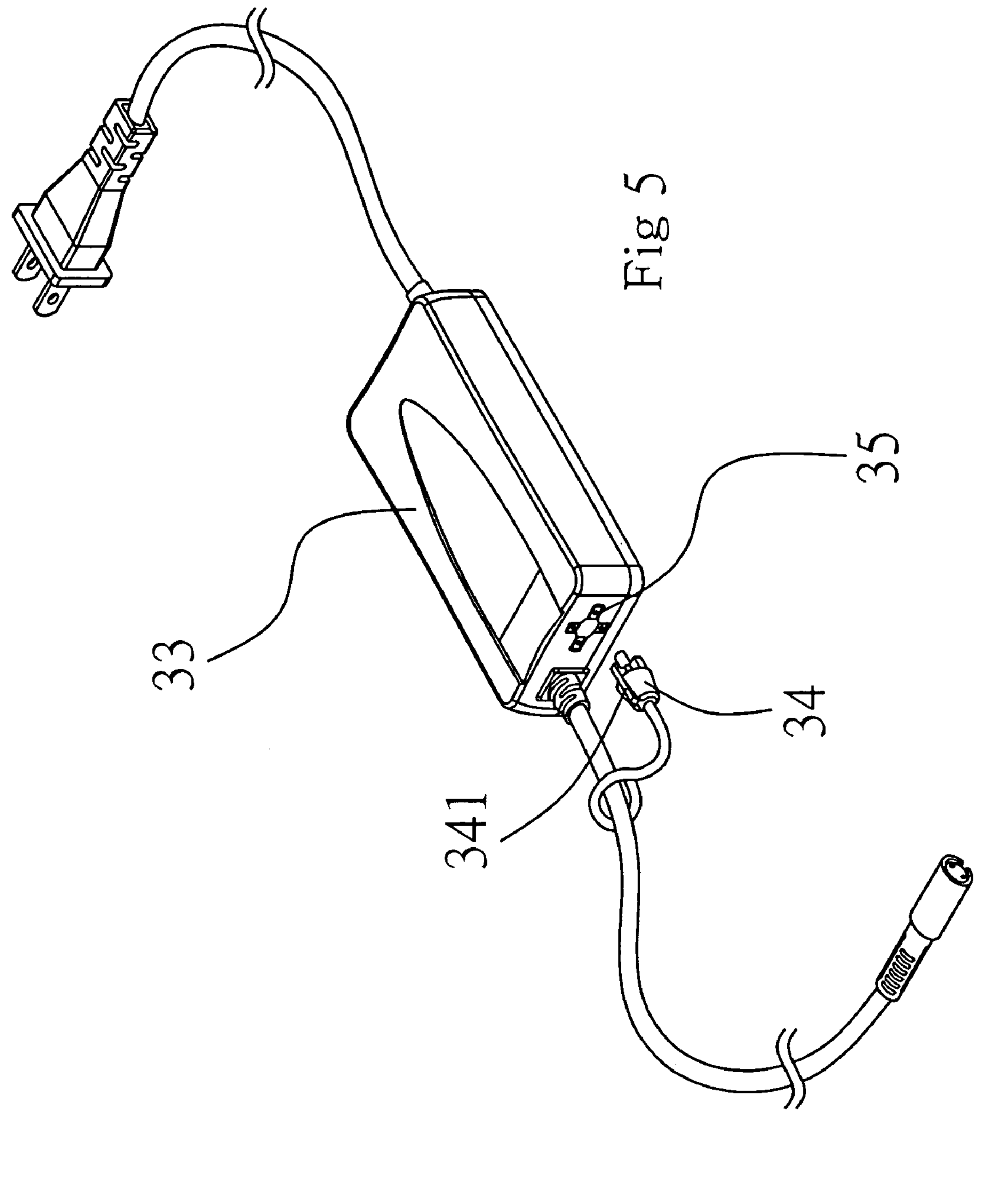
FIG. 5 is a pictorial schematic diagram of the second preferred embodiment of the voltage transformer according to the present invention.
Figure 6:
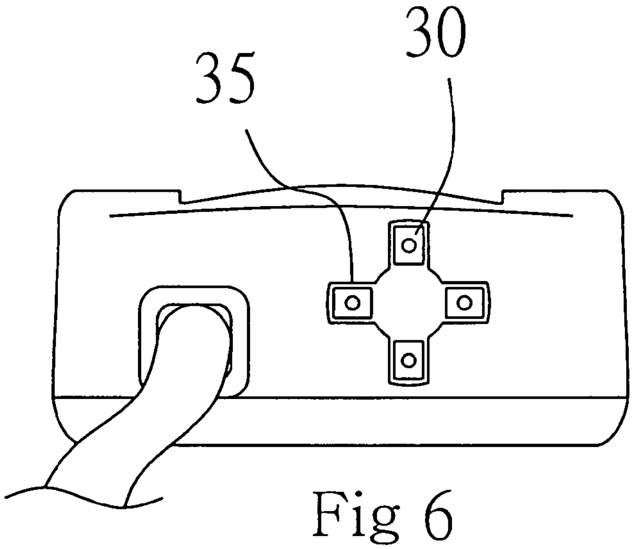
FIG. 6 is an elevational view of the embodiment of FIG. 5.
Figure 7:
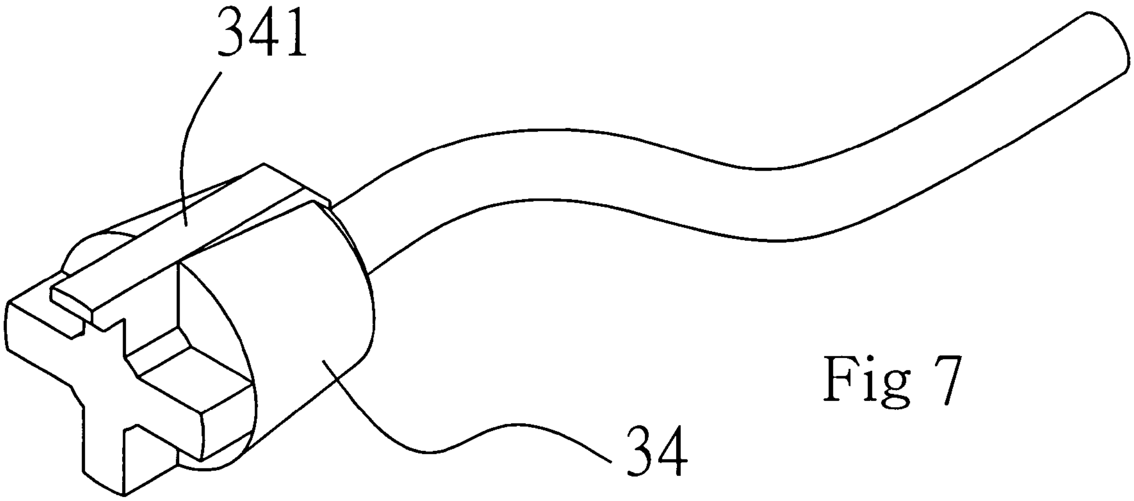
FIG. 7 is an enlarged pictorial partial view of the pin of the embodiment of FIG. 5.

Referring to FIGS. 5 to 7, the second preferred embodiment of the voltage transformer with mechanically actuated voltage-selected switches according to the present invention is shown. The difference from the first preferred embodiment consists in: the pin 24 with planar sequential selection structure is altered to the pin 34 with spatial structure, and the pin 34 has a projecting portion 341 thereon, which can strike into one of a plurality of sockets 35 on the casing 33. Similarly, the mechanically actuated voltage-selected switches 30 corresponding to the sockets 35 are actuated by striking the projecting portion 341 into the sockets 35, to attain the function of selecting various output voltages.

In this embodiment, by means of symmetrical disposition of the sockets 35 in the form of surrounding a central axis, the effect that the single pin 34 selectively actuates the switches in the different sockets 35 respectively can be achieved. Not only the structure is simpler, but also it can reduce cost effectively and prevents the loss of each component due to carelessness.

Figure 8:
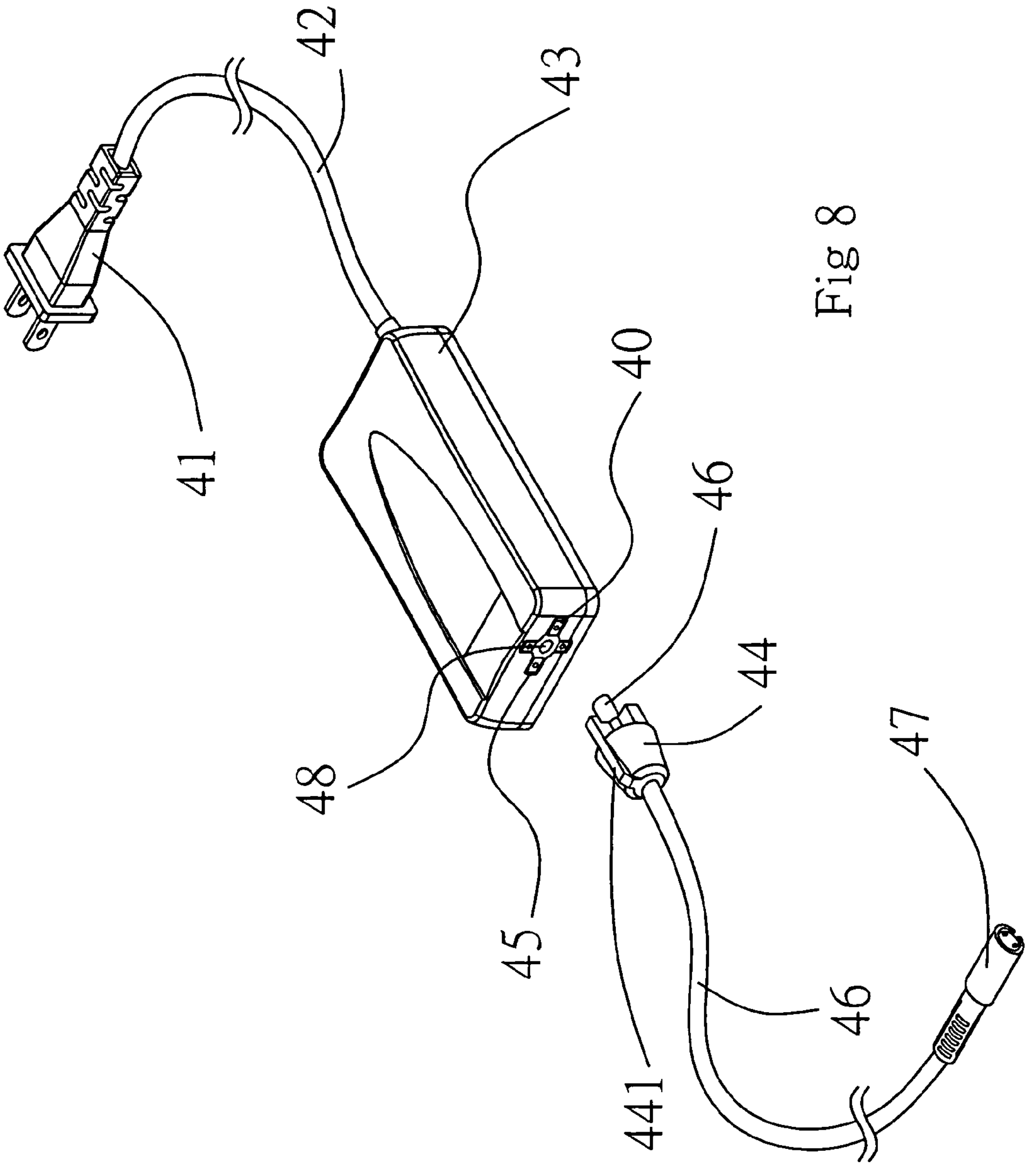
FIG. 8 is a pictorial schematic diagram of the third preferred embodiment of the voltage transformer according to the present invention.
Figure 9:
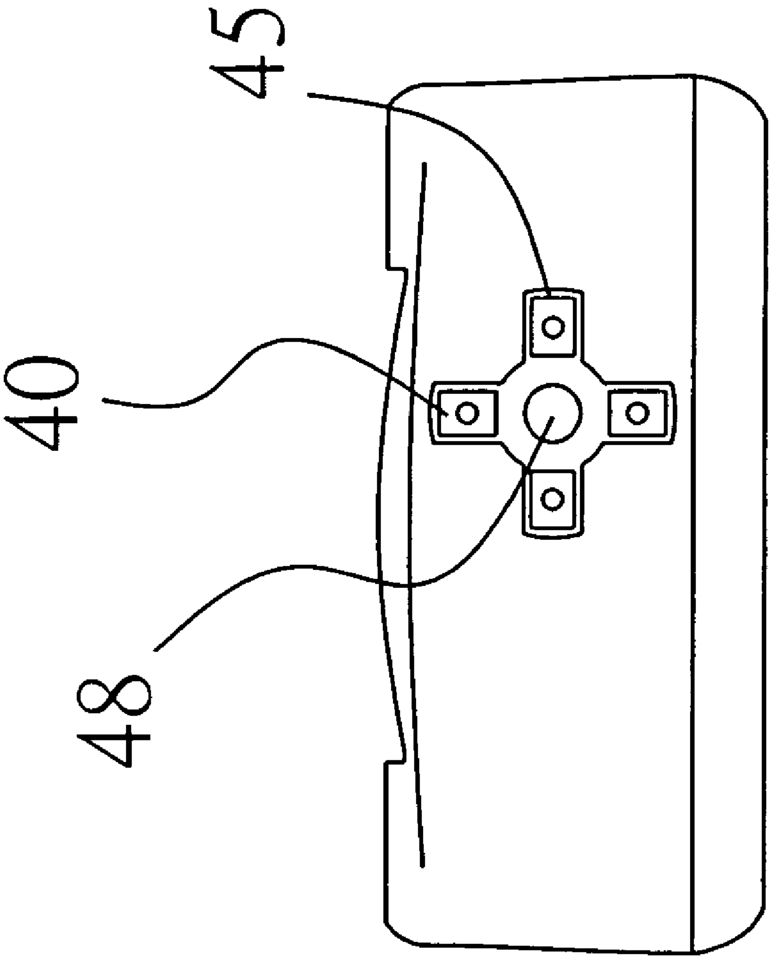
FIG. 9 is an elevational view of the embodiment of FIG. 8.

Referring to FIGS. 8 and 9, the third preferred embodiment according to the present invention, as same as the foregoing two embodiments, it has the same input port 41, input conducting wire 42, casing 43 of the voltage transformer, and output port 47 as those in the first embodiment.

Only in this embodiment, a through hole whose inner diameter corresponds to the outer diameter of the output conducting wire 46 is formed in the pin 44, moreover, the output conducting wire 46 penetrates the through hole and be used in combination with the through hole. The output conducting wire 46 and the pin 44 can be put in the sockets 45 simultaneously, it makes the projecting portion 441 to actuate the different mechanically actuated voltage-selected switches 40, which correspond to said sockets of the casing respectively, by putting the pin 44 in the different sockets 45 on the casing 43 selectively at a corresponding angle by means of, in order to attain the function of selecting the different output voltages respectively. Further, it outputs the selected voltage via a power supply jack 48 formed in the sockets 45 for electrically connecting the conducting wire 46.

In this embodiment, the pin 44 and the output conducting wire 46 are further integrated in one, thus it is more convenient and steady in use.

Figure 11:
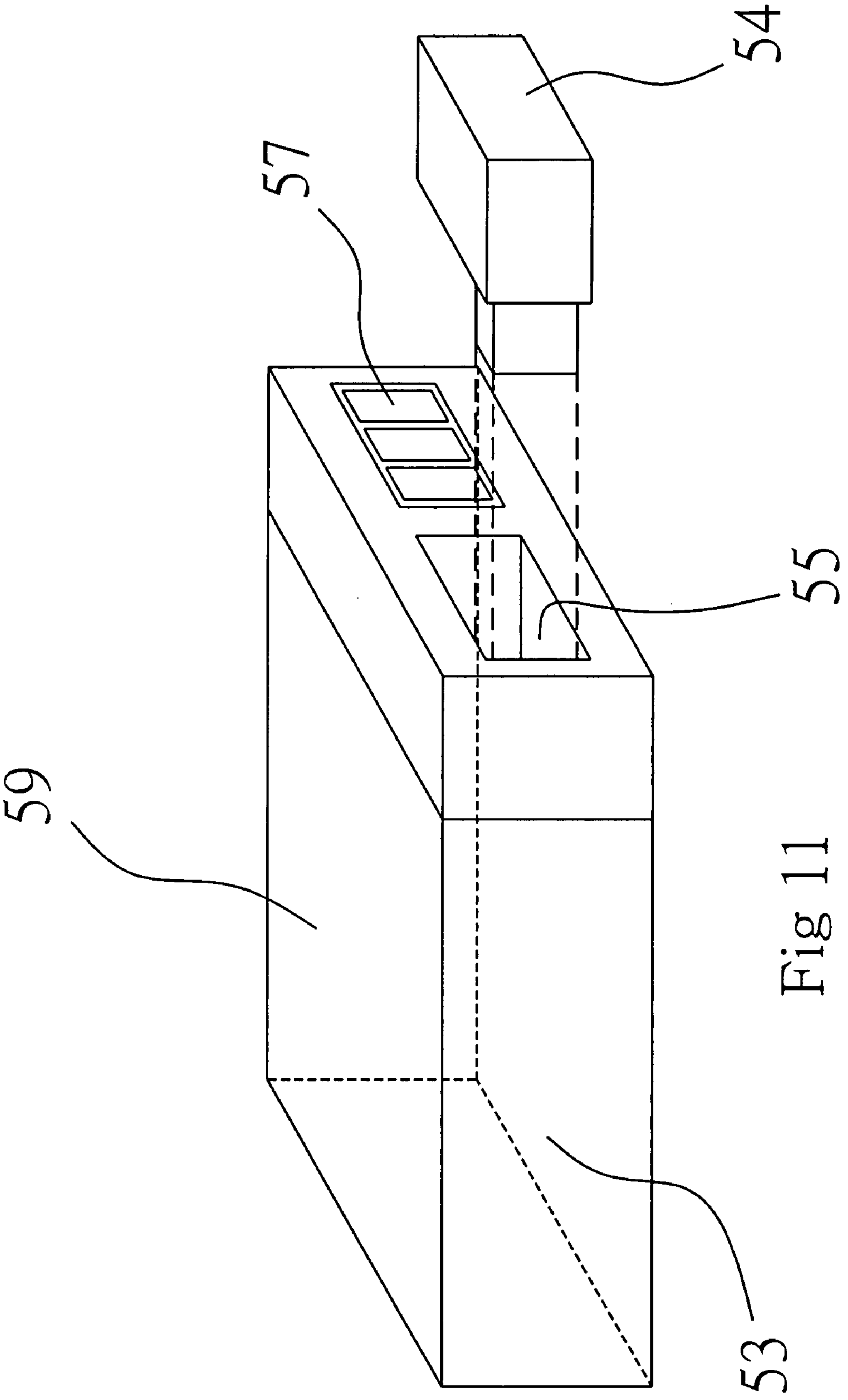
FIG. 11 is a pictorial schematic diagram of the fourth preferred embodiment according to the present invention.

Still further, as the fourth preferred embodiment according to the present invention illustrated in FIG. 11, the above-mentioned voltage transformer is integrated with a rechargeable battery, to serve as a battery for outputting various voltages. Therefore, it not only includes the foregoing voltage transformation unit, but also includes a rechargeable battery 59 in the casing 53, so the input port of this embodiment hides inside the casing. The output port is exemplified by the terminal 57; the pin 54 and the socket 55 as mentioned above can be correspondingly matched and changed. The electric energy stored in the battery can be outputted in different voltages by means of the integration of the present voltage transformer with the battery, it provides sufficient selectivity in use.

In summary, by way of the present invention, consumers can select the optimum voltage output according to the requirements of different electric appliances. Whenever at home or especially outdoors, it is unnecessary to arrange several voltage transformers at the same time, hence the purpose of the present invention that economizes consumers' purchasing cost as well as enhances the convenience and flexibility in use can be achieved.

What has been described above are the preferred embodiments of the present invention only, it is not intended to limit the scope of practice of the present invention, in principle, any equivalent variation and modification made according to the claims and specification should be included within the scope of the claims.

What is claimed is:

1. A voltage transformer with mechanically actuated voltage-selected switches for providing an input voltage transformed into one of a plurality of predetermined output voltages, comprising:

- a casing configured with a plurality of sockets;
- an input port for receiving said input voltage;
- an output port for outputting one of a plurality of said predetermined output voltages, from which an output conducting wire extends;
- a voltage transformation unit, wherein the unit is disposed in the casing and its both ends are electrically connected to the input port and output port respectively, comprising
- a voltage transformation circuit; and
- a plurality of selective circuits, provided with a plurality of mechanically actuated voltage-selected switches corresponding to said sockets of the casing respectively, and a plurality of different circuit elements corresponding to each of said mechanically actuated voltage-selected switches respectively, one side of said selective circuits is connected to said voltage transformation circuit; and
- a pin physically separated and independently operable from the output conducting wire for plugging into one of said sockets where said pin and said socket are in non-metallic contact with respect to each other and actuating said corresponding mechanically actuated voltage-selected switches, thereby selecting said output voltage.

2. The voltage transformer with mechanically actuated voltage-selected switches according to claim 1, further comprising an input power supply connecting line connected to said input port and an output power supply connecting line connected to said output port.

3. The voltage transformer with mechanically actuated voltage-selected switches according to claim 1, wherein each of said mechanically actuated voltage-selected switches is a microswitch respectively.

4. The voltage transformer with mechanically actuated voltage-selected switches according to claim 1, wherein said pin has at least a projecting portion, said projecting portion is put into said socket by said pin and bunts a touch piece of a corresponding switch.

5. A voltage transformer with mechanically actuated voltage-selected switches for providing an input voltage transformed into one of a plurality of predetermined output voltages, comprising:

- a casing configured with a plurality of sockets;
- an input port for receiving said input voltage;
- an output port for outputting one of a plurality of said predetermined output voltages, from which an output conducting wire extends;
- a voltage transformation unit, wherein the unit is disposed in the casing and its both ends are electrically connected to the input port and output port respectively, comprising
- a voltage transformation circuit; and
- a plurality of selective circuits, provided with a plurality of mechanically actuated voltage-selected switches corresponding to said sockets of the casing respectively, and a plurality of different circuit elements corresponding to each of said mechanically actuated voltage-selected switches respectively, one side of said selective circuits is connected to said voltage transformation circuit; and
- a pin physically separated and independently operable from the output conducting wire said pin with spatial structure and having a projecting portion thereon for plugging into one of said sockets where said pin and said socket are in non-metallic contact with respect to each other and actuating said corresponding mechanically actuated voltage-selected switches, thereby selecting said output voltage.

6. The voltage transformer with mechanically actuated voltage-selected switches according to claim 5, wherein said sockets are symmetrically disposed in the form of surrounding a central axis.

7. The voltage transformer with mechanically actuated voltage-selected switches according to claim 1, further comprising a rechargeable battery in said casing.

8. The voltage transformer with mechanically actuated voltage-selected switches according to claim 5, further comprising a rechargeable battery in said casing.

9. The voltage transformer with mechanically actuated voltage-selected switches according to claim 5, further comprising a rechargeable battery in said casing.

10. A voltage transformer with mechanically actuated voltage-selected switches for providing an input voltage transformed into one of a plurality of predetermined output voltages, comprising:

- a casing configured with a plurality of sockets;
- an input port for receiving said input voltage;
- a common output port for outputting one of a plurality of said predetermined output voltages;
- a voltage transformation unit, wherein the unit is disposed in the casing and its both ends are electrically connected to the input port and output port respectively, comprising a voltage transformation circuit; and
- a plurality of selective circuits, provided with a plurality of mechanically actuated voltage-selected switches corresponding to said sockets of the casing respectively, and a plurality of different circuit elements corresponding to each of said mechanically actuated voltage-selected switches respectively, one side of said selective circuits is connected to said voltage transformation circuit; and
- a pin for plugging into one of said sockets wherein said pin and said socket are in a non-metallic contact with respect to each other and actuating said corresponding mechanically actuated voltage-selected switches, thereby selecting said output voltage.

* * * * *